United States Patent
Kuehnle et al.

(10) Patent No.: US 9,902,267 B2
(45) Date of Patent: Feb. 27, 2018

(54) PREDICTED POSITION DISPLAY FOR VEHICLE

(71) Applicant: Bendix Commercial Vehicle Systems LLC, Elyria, OH (US)

(72) Inventors: Andreas Kuehnle, Villa Park, CA (US); Marton Gyori, Budapest (HU); Hans Molin, Mission Viejo, CA (US); Huba Nemeth, Budapest (HU)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 14/709,998

(22) Filed: May 12, 2015

(65) Prior Publication Data
US 2016/0332516 A1    Nov. 17, 2016

(51) Int. Cl.
*B60K 35/00*    (2006.01)
*B60R 1/00*    (2006.01)
(Continued)

(52) U.S. Cl.
CPC .............. *B60K 35/00* (2013.01); *B60R 1/00* (2013.01); *B62D 15/029* (2013.01); *G08G 1/165* (2013.01); *G08G 1/168* (2013.01); *H04N 7/181* (2013.01); *H04N 7/183* (2013.01); *B60R 2300/105* (2013.01); *B60R 2300/301* (2013.01);
(Continued)

(58) Field of Classification Search
None
See application file for complete search history.

(56) References Cited

U.S. PATENT DOCUMENTS

| | | |
|---|---|---|
| 6,564,122 B1 | 5/2003 | Huertgen et al. |
| 8,244,408 B2 | 8/2012 | Lee et al. |

(Continued)

FOREIGN PATENT DOCUMENTS

| | | |
|---|---|---|
| EP | 2555519 A1 | 2/2013 |
| EP | 3006294 A1 | 4/2016 |

(Continued)

OTHER PUBLICATIONS

Notification of Transmittal of The International Search Report and the Written Opinion of The International Searching Authority, or The Declaration for counterpart International Application No. PCT/US2016/031574, dated Jul. 14, 2016 (1 page).

(Continued)

*Primary Examiner* — Mussa A Shaawat
*Assistant Examiner* — Abdhesh Jha
(74) *Attorney, Agent, or Firm* — Brian E. Kondas; Cheryl L. Greenly; Eugene E. Clair

(57) ABSTRACT

A processing device controls an associated display. The processing device includes an input for receiving electronic signals from an object detector. The object detector detects an object relative to a vehicle. The processing device also includes a means for predicting a position of the vehicle at a future time, a means for generating first signals for causing an image of the vehicle at the predicted position at the future time relative to the object to be displayed on the associated display device, and an output transmitting the first signals to the associated display for causing the image of the vehicle at the predicted position at the future time relative to the object to be displayed on the associated display device.

18 Claims, 5 Drawing Sheets

(51) Int. Cl.
  *G08G 1/16* (2006.01)
  *H04N 7/18* (2006.01)
  *B62D 15/02* (2006.01)

(52) U.S. Cl.
  CPC ... *B60R 2300/305* (2013.01); *B60R 2300/607* (2013.01); *B60R 2300/802* (2013.01); *B60R 2300/806* (2013.01); *B60R 2300/8086* (2013.01); *B60R 2300/8093* (2013.01); *G08G 1/166* (2013.01)

(56) References Cited

U.S. PATENT DOCUMENTS

| | | |
|---|---|---|
| 2011/0001825 A1 | 1/2011 | Hahn |
| 2014/0097968 A1* | 4/2014 | Kamiya .............. B60Q 1/0023 340/905 |
| 2014/0267688 A1 | 9/2014 | Aich et al. |
| 2014/0303847 A1* | 10/2014 | Lavoie .............. B62D 15/0275 701/41 |
| 2015/0073664 A1 | 3/2015 | Petridis et al. |
| 2016/0114800 A1 | 4/2016 | Shimizu |

FOREIGN PATENT DOCUMENTS

| | | | |
|---|---|---|---|
| FR | 2979300 | * 8/2011 | .............. B60R 1/00 |
| FR | 2979300 A1 | 3/2013 | |
| WO | 2014192370 A1 | 12/2014 | |

OTHER PUBLICATIONS

International Search Report for counterpart International Application No. PCT/US2016/031574, dated Jul. 14, 2016 (5 pages).
Written Opinion of the International Searching Authority for counterpart International Application No. PCT/US2016/031574, dated Jul. 14, 2016 (5 pages).

* cited by examiner

PREDICTED POSITION DISPLAY FOR VEHICLE

BACKGROUND

The present invention relates to an overview of a vehicle. It finds particular application in conjunction with displaying an overview of the vehicle and a predicted position of the vehicle and will be described with particular reference thereto. It will be appreciated, however, that the invention is also amenable to other applications.

Vehicle driving aids are known which warn the driver of the vehicle of objects which are too near to the front and/or rear of the vehicle. In such systems, proximity sensors are typically mounted in the front and/or rear bumpers. When an object is detected close to the front or rear of the vehicle, an audible alarm, typically a beeper, is sounded. As the vehicle gets closer to the detected object, the frequency of the alarm sound may increase until the object is at a predefined distance from the vehicle, at which point a continuous alarm is sounded.

Other driving aids display relative positions of the vehicle and the detected object. With such display systems, the driver must interpret the image on the screen in order to assess whether a predicted trajectory will result in a collision and, if so, when.

The present invention provides a new and improved apparatus and method which addresses the above-referenced problems.

SUMMARY

In one embodiment, a processing device controls an associated display. The processing device includes an input for receiving electronic signals from an object detector. The object detector detects an object relative to a vehicle. The processing device also includes a means for predicting a position of the vehicle at a future time, a means for generating first signals for causing an image of the vehicle at the predicted position at the future time relative to the object to be displayed on the associated display device, and an output transmitting the first signals to the associated display for causing the image of the vehicle at the predicted position at the future time relative to the object to be displayed on the associated display device.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
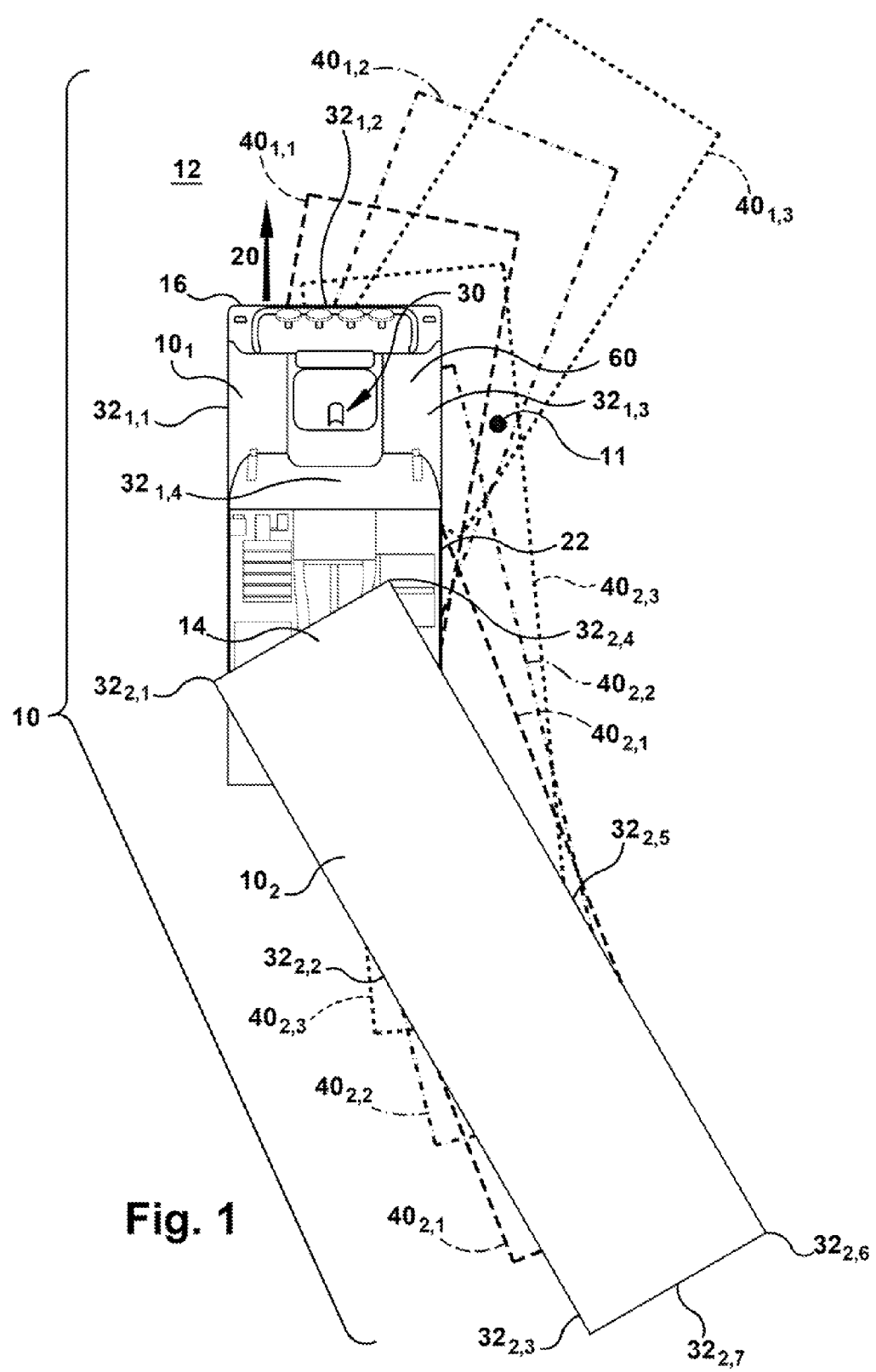
FIG. 1 illustrates a overview representation of a vehicle driving along a path in accordance with one embodiment of an apparatus illustrating principles of the present invention.

With reference to FIG. 1, an overview (e.g., bird's eye view) of a vehicle 10 driving along a path 12 (e.g., road) is illustrated. In one embodiment, the vehicle 10 is articulated and includes a first portion $10_1$ (e.g., a tractor or front portion), a second portion $10_2$ (e.g., a trailer or a rear portion), and a hinge point 14 between the first and second portions $10_{1,2}$. The first portion $10_1$ and the second portion $10_2$ are collectively referred to as the vehicle 10. A front 16 of the vehicle 10 is generally facing in the direction indicated by an arrow 20. However, for purposes of discussion, it is assumed a steering wheel of the vehicle is turned so that the front 16 of the vehicle 10 is turning to the right.

An object 11 is illustrated along the road 12. In the illustrated embodiment, the object 11 is in front and to a right side 22 of the vehicle 10. In addition, for purposes of discussion, the object 11 is assumed to be stationary. However, other embodiments in which the object 11 is moving are also contemplated. Although only one object 11 is illustrated, it is to be assumed any number of objects are present.

Figure 2:
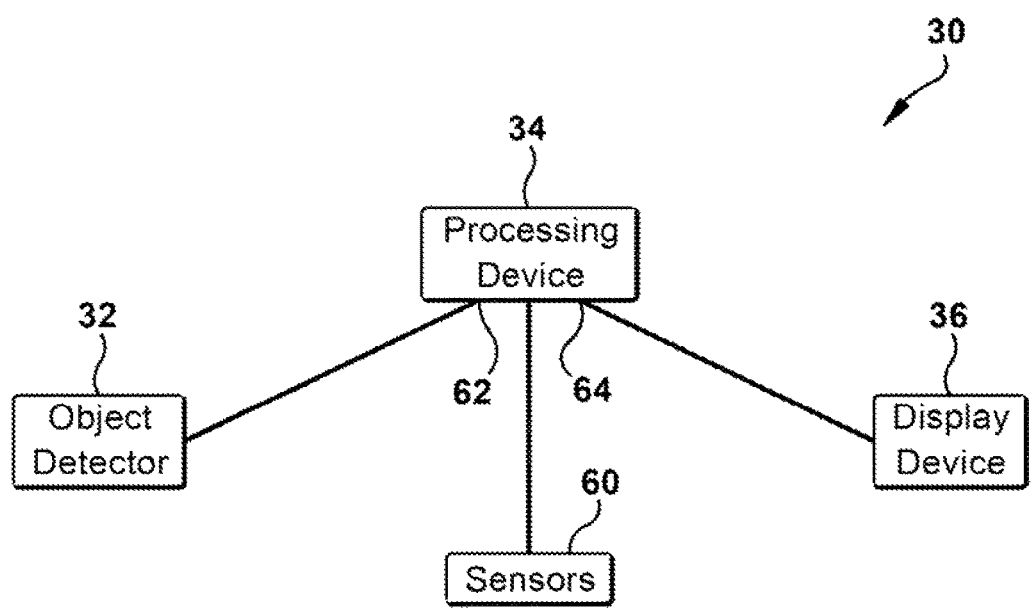
FIG. 2 illustrates a schematic representation of a system in accordance with one embodiment of an apparatus illustrating principles of the present invention.

The vehicle 10 includes a collision warning system 30. FIG. 2 illustrates an exemplary simplified component diagram of the system 30 in in accordance with one embodiment of the present invention.

With reference to FIGS. 1 and 2, the system 30 includes an object detector 32, a processing device 34, and a display device 36 (e.g., a display means). It is contemplated that the processing device 34 electrically communicates with both the object detector 32 and the display device 36. As discussed below, the processing device 34 determines predicted positions of the vehicle according to a prediction model and transmits signals to the display 36 for displaying the predicted positions of the vehicle 10 relative to the object 11 over time. In one embodiment, the object detector 32 is capable of detecting objects (e.g., the object 11) around and relative to the vehicle 10. In the illustrated embodiment, the object detector 32 is a camera system including cameras $32_{1,1;\ 1,2;\ 1,3;\ 1,4;\ 2,1;\ 2,2;\ 2,3;\ 2,4;\ 2,5;\ 2,6;\ 2,7}$ (collectively 32) positioned around and an exterior of the vehicle 10. In this example, four (4) cameras $32_{1,1;\ 1,2;\ 1,3;\ 1,4}$ (collectively $32_1$) are positioned around the exterior of the first portion $10_1$ of the vehicle and seven (7) cameras $32_{2,1;\ 2,2;\ 2,3;\ 2,4;\ 2,5;\ 2,6;\ 2,7}$ (collectively $32_2$) are positioned around the exterior of the second portion $10_2$ of the vehicle. In another embodiment, it is also contemplated that the object detector 32 is a radar system including sensors positioned around an exterior of the vehicle 10. It is to be understood that the number of cameras 32 or sensors positioned around the exterior of the vehicle portions $10_{1,2}$ can easily be modified to include more or fewer cameras 32 or sensors. It is to be understood the illustration of FIG. 1 is displayed on the display device 36. The object detector 32 acts as a means for detecting objects relative to the vehicle.

Various sensors 60 are included on the vehicle 10. The sensors 60 may include a steering angle sensor for determining an angle at which the steering wheel is turned, wheel speed sensors for determining a speed at which wheels of the vehicle 10 turn, yaw rate sensors, etc. The processing device 34 electrically communicates with the sensors 60. Data received by the sensors 60 and transmitted to the processing device 34 are used by the processing device 34 to predict positions of the vehicle over time. As discussed above, any model for describing motion and movement and predicting positions of the vehicle over time may be used. One known model used for describing motion and movement and predicting positions of a vehicle (e.g., the illustrated vehicle 10) over time is known as the "Bicycle Model." Although the Bicycle Model is described in detail above, it is to be understood any other model for describing motion and movement of an articulated vehicle may also be used. The Bicycle Model is described in "An Improved Model-Based Predictive Control Of Vehicle Trajectory By Using Nonlinear Function", Journal of Mechanical Science and Technology 23 (2009), pp. 918-922.

It is to be understood that the processing device 34 controls the associated display 36 by generating signals that are transmitted to the display 36 for causing images to appear on the display 36. The processing device 34 includes an input 62 for receiving electronic signals from the object detector 32. The object detector 32 detects the object 11 relative to the vehicle 10. The processing device 34 also includes a means for predicting a position of the vehicle at a future time, a means for generating first signals for causing an image of the vehicle at the predicted position at the future time relative to the object to be displayed on the associated display device 34, and an output 64 transmitting the first signals to the associated display 36 for causing the image of the vehicle at the predicted position at the future time relative to the object 11 to be displayed on the associated display device 36. It is to be understood that, in one embodiment, the means for predicting the position of the vehicle 10 at the future time and the means for generating first signals for causing the image of the vehicle at the predicted position at the future time relative to the object to be displayed on the associated display device 34 are software included in the processing device 34.

The hinge point 14 increases the difficulty of maneuvering the vehicle 10. In that regard, an operator (e.g., driver) of the vehicle 10 must monitor multiple points along the portions of the vehicle $10_{1,2}$ length—particularly as the vehicle 10 turns—for possible collisions with objects. In one embodiment of the present invention, a system and method is described that aids the driver in maneuvering the vehicle 10 by indicating on the display 36 where various portions of the vehicle $10_{1,2}$ will be at various time horizons.

The motion model is run for various time horizons, generating various predicted positions of the first and second vehicle portions $10_1$, $10_2$. These positions are calculated for the various portions $10_{1,2}$ of the vehicle. In one embodiment, the cameras $32_{2,1; 2,3; 2,4; 2,6}$ are positioned at the corners of the second vehicle portion $10_2$ and the cameras $32_{1,1; 1,3; 2,2; 2,5}$ are positioned at midpoints along the lengths of the first and second portions $10_{1,2}$ of the vehicle, where extreme deviations from a circular course occur (e.g., where a straight vehicle segment cuts the curve). The camera $32_{1,2}$ is positioned along a midpoint of the front of the first portion $10_1$ of the vehicle, the camera $32_{1,4}$ is positioned along a midpoint of the back of the first portion $10_1$ of the vehicle, and the camera $32_{2,7}$ is positioned along a midpoint of the back of the second portion $10_2$ of the vehicle.

Predicted positions and paths $40_{1,1; 1,2; 1,3}$ (collectively $40_1$) for three (3) respective time horizons are illustrated as predicted positions of the first portion of the vehicle $10_1$. In addition, predicted positions $40_{2,1; 2,2; 2,3}$ (collectively $40_2$) for the three (3) respective time horizons are illustrated as predicted positions of the second portion of the vehicle $10_2$.

The predicted position $40_1$ and the predicted position $40_2$ are collectively referred to as the predicted position 40. In one embodiment, the three (3) time horizons are 0.1, 0.2 and 0.3 seconds. Therefore, the predicted position $40_{1,1}$ represents the predicted position of the first portion of the vehicle $10_1$ after the first time horizon (e.g., 0.1 second); the predicted position $40_{1,2}$ represents the predicted position of the first portion of the vehicle $10_1$ after the second time horizon (e.g., 0.2 seconds); and the predicted position $40_{1,3}$ represents the predicted position of the first portion of the vehicle $10_1$ after the third time horizon (e.g., 0.3 seconds). Similarly, the predicted position $40_{2,1}$ represents the predicted position of the second portion of the vehicle $10_2$ after the first time horizon (e.g., 0.1 second); the predicted position $40_{2,2}$ represents the predicted position of the second portion of the vehicle $10_2$ after the second time horizon (e.g., 0.2 seconds); and the predicted position $40_{2,3}$ represents the predicted position of the second portion of the vehicle $10_2$ after the third time horizon (e.g., 0.3 seconds).

In one embodiment, the respective positions of the first and second portions of the vehicle $10_{1,2}$ at the different time horizons are illustrated differently on the display 36. In the illustrated embodiment, the respective predicted positions $40_{1,1; 1,2; 1,3; 2,1; 2,2; 2,3}$ of the vehicle 10 at the three (3) respective time horizons are illustrated as different colored lines on the display 36. The different colored lines represent outlines of the vehicle portions $10_1$, $10_2$ at the respective time horizons. For example, the predicted positions $40_{1,1; 2,1}$ representing the predicted position of the vehicle portions $10_1$, $10_2$ at the first time horizon (e.g., in 0.1 second) are colored red; the predicted positions $40_{1,2; 2,2}$ representing the predicted position of the vehicle portions $10_1$, $10_2$ at the second time horizon (e.g., in 0.2 seconds) are colored yellow; and the lines of the predicted positions $40_{1,3; 2,3}$ representing the predicted position of the vehicle portions $10_1$, $10_2$ at the third time horizon are colored green (e.g., in 0.3 seconds).

In the embodiment illustrated in FIG. 1, all of the predicted positions $40_{1,1; 1,2; 1,3; 2,1; 2,2; 2,3}$ are illustrated simultaneously, in the three (3) respective colors (e.g., red, yellow, green), for various points of the first and second portions of the vehicle $10_{1,2}$. In other words, all of the predicted positions $40_{1,1; 1,2; 1,3; 2,1; 2,2; 2,3}$ are illustrated statically, together on the screen.

Figure 3:
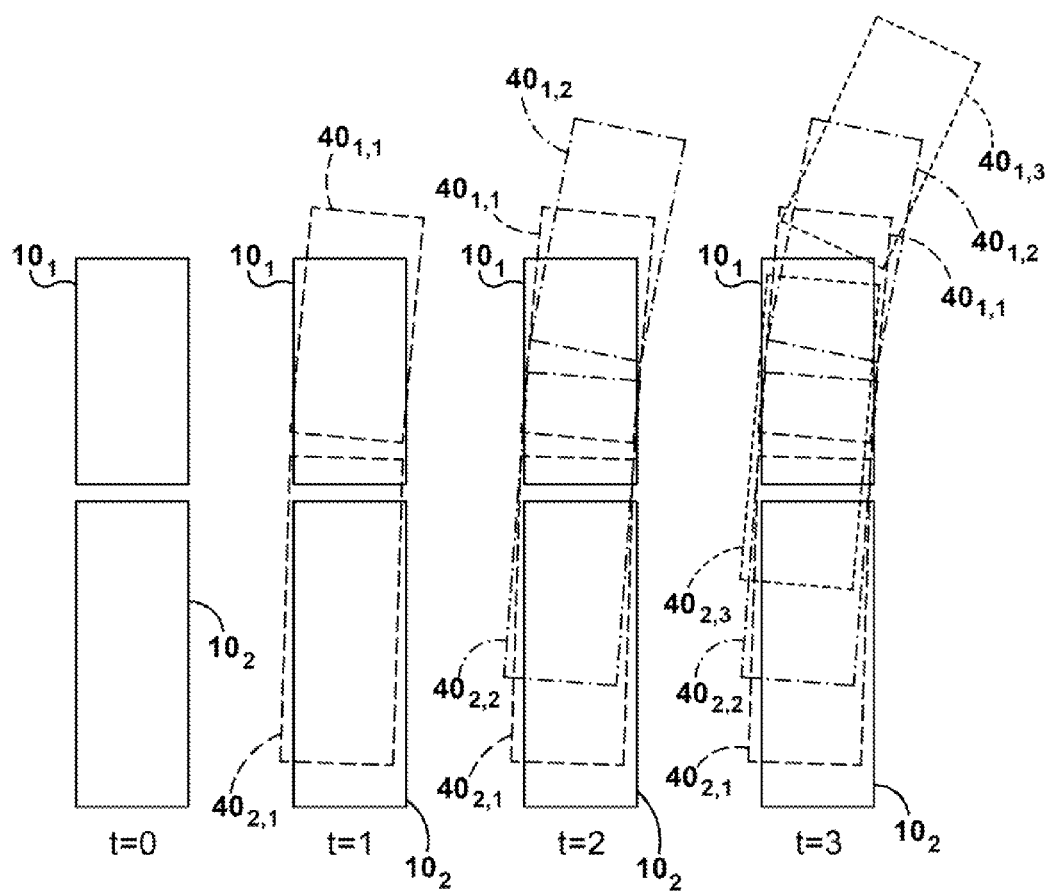
FIG. 3 illustrates an overview representation of a vehicle and a predicted position over time in accordance with one embodiment of an apparatus illustrating principles of the present invention.

In an alternate embodiment illustrated in FIG. 3, the predicted positions $40_{1,1; 1,2; 1,3; 2,1; 2,2; 2,3}$ are illustrated as dynamically displayed on the display device 36, in the three (3) respective colors (e.g., red, yellow, green), for various points of the first and second portions of the vehicle $10_{1,2}$. For example, in FIG. 3, the first and second portions of the vehicle $10_{1,2}$ are illustrated at respective current positions at time t=0. At time t=1 (e.g., 0.1 second after t=0), the first and second portions of the vehicle $10_{1,2}$ are illustrated at the predicted positions $40_{1,1; 2,1}$, which represents the predicted position of the first and second portions of the vehicle $10_{1,2}$ after the first time horizon (e.g., 0.1 second). At time t=2 (e.g., 0.1 second after t=1), the first and second portions of the vehicle $10_{1,2}$ are illustrated at the predicted positions $40_{1,1; 1,2; 2,1; 2,2}$, which represent the predicted positions of the first and second portions of the vehicle $10_{1,2}$ after both the first time horizon (e.g., 0.1 second) and the second time horizon (e.g., 0.2 seconds). At time t=3 (e.g., 0.1 second after t=2), the first and second portions of the vehicle $10_{1,2}$ are illustrated at the predicted positions $40_{1,1; 1,2; 1,3; 2,1; 2,2; 2,3}$, which represent the predicted positions of the first and second portions of the vehicle $10_{1,2}$ after the first time horizon (e.g., 0.1 second), the second time horizon (e.g., 0.2 seconds), and the third time horizon (e.g., 0.3 seconds).

In FIGS. 2 and 3, the illustrations are shown accumulatively. In other words, the display 36 initially shows the first and second portions of the vehicle $10_{1,2}$ at the respective current positions at time t=0. Then, the first and second portions of the vehicle $10_{1,2}$ are and the first predicted positions $40_{1,1;\ 2,1}$ are illustrated at time t=1 (i.e., the first predicted positions $40_{1,1;\ 2,1}$ are added at the time t=1 to the current positions of the first and second portions of the vehicle $10_{1,2}$). Then, the first and second portions of the vehicle $10_{1,2}$, the respective first predicted positions $40_{1,1;\ 2,1}$, and the respective second predicted positions $40_{1,2;\ 2,2}$ are illustrated at time t=2 (i.e., the second predicted positions $40_{1,2;\ 2,2}$ are added at the time t=2 to the first predicted positions $40_{1,1;\ 2,1}$ and the current positions of the first and second portions of the vehicle $10_{1,2}$). Then, the first and second portions of the vehicle $10_{1,2}$, the first predicted positions $40_{1,1;\ 2,1}$, the second predicted positions $40_{1,2;\ 2,2}$, and the third predicted positions $40_{1,3;\ 2,3}$ are illustrated at time t=3 (i.e., the third predicted positions $40_{1,3;\ 2,3}$ are added at the time t=3 to the second predicted positions $40_{1,2;\ 2,2}$, the first predicted positions $40_{1,1;\ 2,1}$, and the current positions of the first and second portions of the vehicle $10_{1,2}$). After the first and second portions of the vehicle $10_{1,2}$ are and all three of the respective predicted positions $40_{1,1;\ 2,1;\ 3,1;\ 2,1;\ 2,2;\ 2,3}$ are illustrated at time t=3, the display cycles back to only displaying the first and second portions of the vehicle $10_{1,2}$ at time t=0 before repeating the accumulated displays of the three predicted positions $40_{1,1;\ 2,1;\ 3,1;\ 2,1;\ 2,2;\ 2,3}$ as described. In one embodiment, an entire cycle of accumulatively displaying the first and second portions of the vehicle $10_{1,2}$ at time t=0 and the three respective predicted positions $40_{1,1;\ 2,1;\ 3,1;\ 2,1;\ 2,2;\ 2,3}$ at times t=1, t=2, and t=3, respectively, is about 0.1 seconds. However other cycle times are also contemplated.

Figure 4:
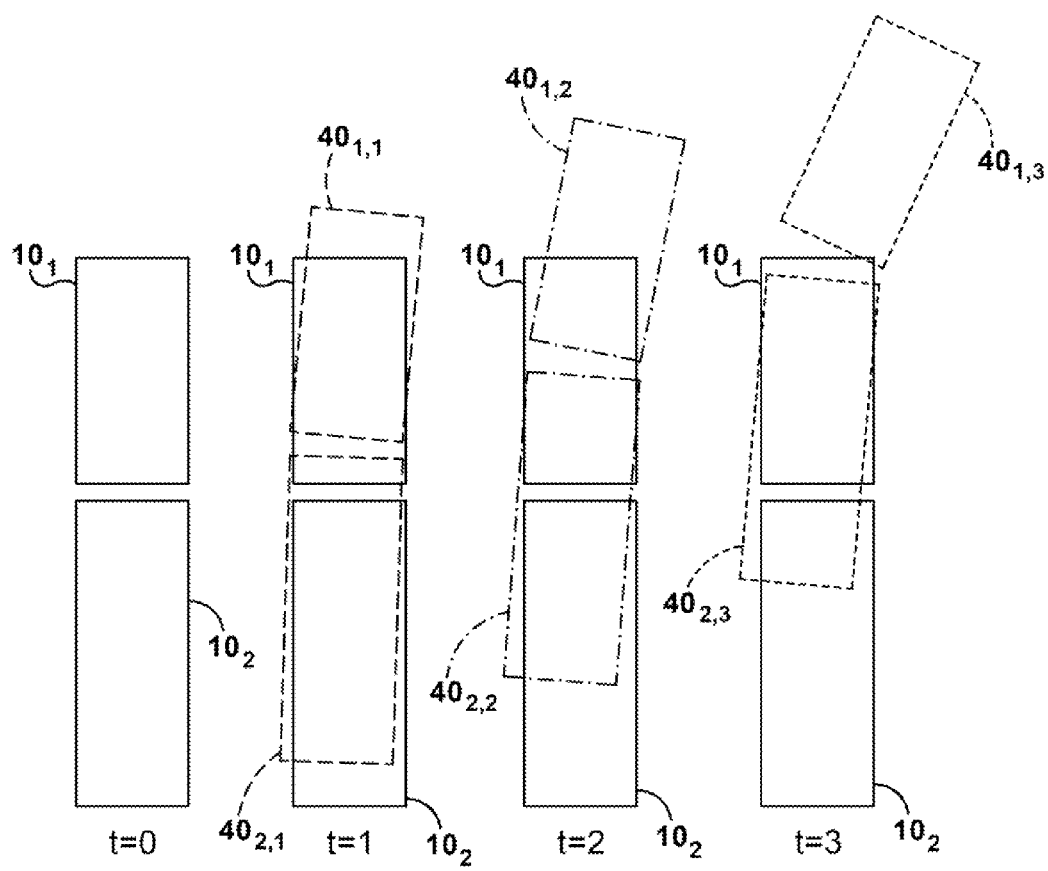
FIG. 4 illustrates another overview representation of a vehicle and a predicted position over time in accordance with one embodiment of an apparatus illustrating principles of the present invention.

In another embodiment as illustrated in FIGS. 2 and 4, the first and second portions of the vehicle $10_{1,2}$ are displayed on the display 36 at time t=0. Then, at each of the times t=1, t=2, and t=3, only the first and second portions of the vehicle $10_{1,2}$ and the respective predicted positions $40_{1,1;\ 2,1;\ 3,1;\ 2,1;\ 2,2;\ 2,3}$ are displayed on the display 36. In other words, only one of the predicted positions $40_{1,1;\ 2,1;\ 3,1}$ and one of the predicted positions $40_{2,1;\ 2,2;\ 2,3}$ are displayed individually on the display 36 at the time t=0 and the three (3) time horizons t=1, t=2, and t=3 along with the first and second portions of the vehicle $10_{1,2}$.

In both the embodiment illustrated in FIG. 3 and the embodiment illustrated in FIG. 4, the processing device 34 causes the display 36 to cycle through the displays discussed above at the times t=0, t=1, t=2, and t=3. As noted above, a cycle time of about 0.1 seconds is used in one embodiment. However, any other cycle times are also contemplated in other embodiments. In addition, it is also contemplated that the time horizon at t=1 (e.g., 0.1 second) is illustrated as red, the time horizon at t=2 (e.g., 0.2seconds) is illustrated as yellow, and the time horizon at t=3 (e.g., 0.3 seconds) is illustrated as green in both the embodiment illustrated in FIG. 3 and the embodiment illustrated in FIG. 4. The driver of the vehicle 10 is thus provided with a sense of where the vehicle 10 is expected to be over time.

Figure 5:
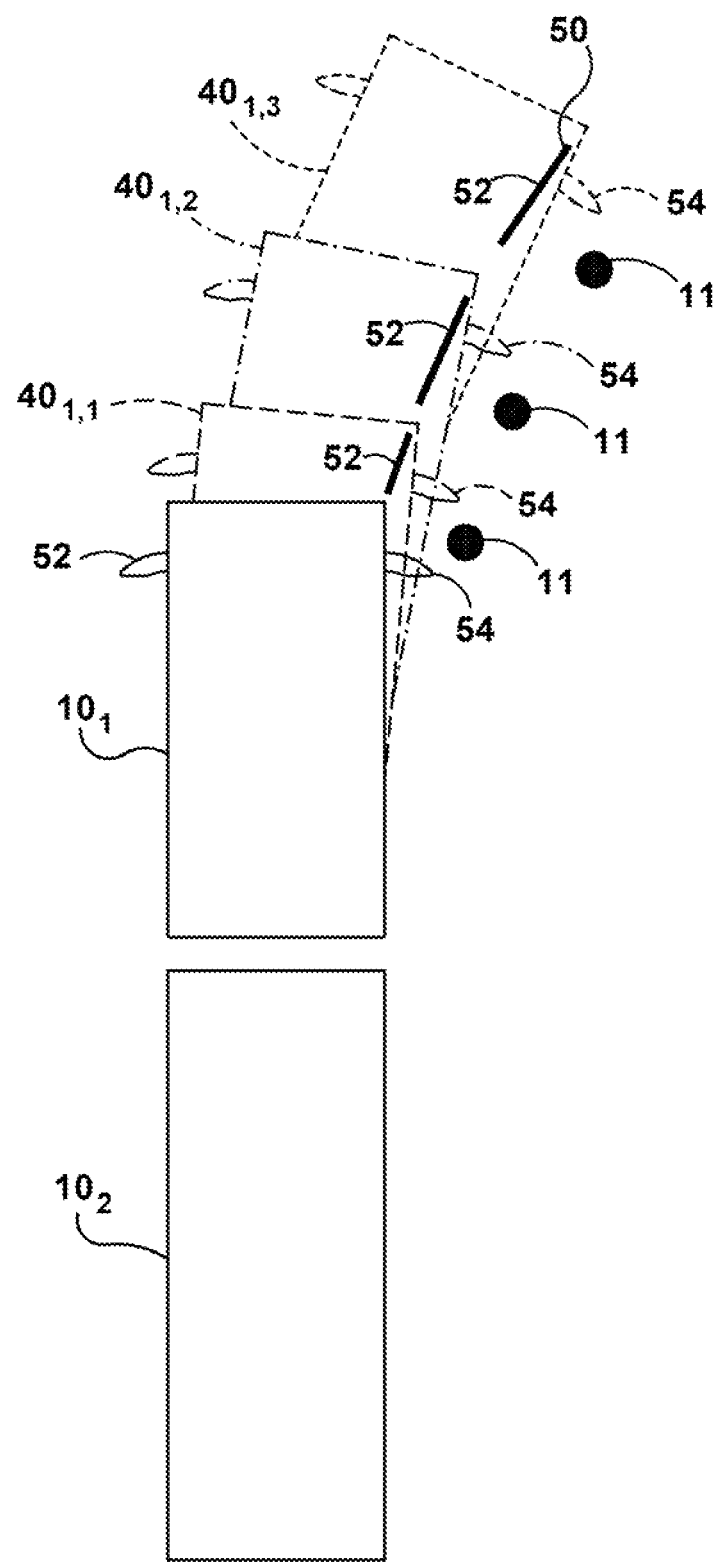
FIG. 5 illustrates another overview representation of a vehicle and a predicted position over time in accordance with one embodiment of an apparatus illustrating principles of the present invention.

With reference to FIGS. 2 and 5, uncertainty in the motion of the first and second portions of the vehicle $10_{1,2}$ relative to the object 11 is illustrated on the display 36 as fuzziness 50 (e.g., shading or gradients) at the predicted path edges 52 (e.g., $40_{1,1}$). In addition, predictions of protuberances 52 of the vehicle segments, such as mirrors, unusually wide loads, etc., colliding with the object 11 may be shown. By using the object detector 32, objects 11 predicted to be within a predetermined distance (e.g., 2 feet) of any part of the vehicle 10, including any protuberance 52 of the vehicle 10, can be identified. In one embodiment, of any part of the vehicle 10, including any protuberance 52 of the vehicle 10, predicted to be within a predetermined distance (e.g., 2 feet) of the object 11 may be highlighted (e.g., prioritized) on the display 36 using thicker lines, different colors, blinking, symbols, increased color saturation, preferential de-blurring, tinting, pulsing, etc. In this manner, the portion(s) of the vehicle 10 predicted to collide with the object 11 are highlighted. In addition, lateral fuzziness or shading 50 may be used to indicate which side of the vehicle 10 is laterally closer (within the predicted positions $40_{1,1;\ 1,2;\ 1,3;\ 2,1;\ 2,2;\ 2,3}$) to the obstacle 11. In general, lateral shading 50 may be used to indicate the presence of an object within the predetermined distance of the predicted position of the vehicle 10.

With reference again to FIGS. 2 and 5, it is contemplated that a split screen or screen inset in the display 36 may show a zoomed in view of the side of the vehicle 10 laterally closer (to the predicted positions $40_{1,1;\ 1,2;\ 1,3;\ 2,1;\ 2,2;\ 2,3}$) to the obstacle 11. In one embodiment, the zoomed in view automatically displays. It is to be understood that those areas, shown on a split screen or inset, may be used to aid further in fine maneuvering in such difficult surroundings.

In one embodiment, the lateral shading 50 is used with any of the predicted positions 40 during the respective time horizon an object is predicted to be within the predetermined distance of the predicted position of the vehicle 10. For example, if the object is predicted to be within the predetermined distance of the predicted position of the second vehicle portion $10_2$ during the third time horizon, but not during either the first time horizon or the second time horizon, only the predicted position $40_{2,3}$ includes the lateral shading.

In one embodiment, a different (e.g., relatively more muted) color set is used for at least one of the predicted positions 40 and the lateral shading 50 during nighttime or low light situations. It is also contemplated that within at least one of the motion predicted positions 40 and the lateral shading 50, a tint, blinking, etc. is used to indicate an imminent collision and its predicted location.

It is also contemplated that the time horizon is configurable and may be personalized for individual vehicle drivers. For example, one driver may prefer to be warned earlier, in which case the driver may decrease the time horizons. For example, decreasing the time horizons may decrease the first time horizon from 0.1 second to 0.05 seconds, decrease the second time horizon from 0.2 seconds to 0.1 second, and decrease the third time horizon from 0.3 seconds to 0.2 seconds. In this case, the first predicted positions $40_{1,1;\ 2,1}$ display the predicted position of the vehicle 10 in 0.05 seconds, the second motion predicted positions $40_{1,2;\ 2,2}$ display the predicted position of the vehicle 10 in 0.1 second (instead of 0.2 seconds), and the third motion predicted positions $40_{1,3;\ 2,3}$ display the predicted position of the vehicle 10 in 0.2 seconds (instead of 0.3 seconds). Alternatively, another driver may prefer to be warned later, in which case the driver may increase the time horizons.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A processing device for controlling an associated display, the processing device including:
an input for receiving electronic signals from a plurality of object detectors positioned on and around an exterior of an associated vehicle, the object detectors detecting an object relative to the associated vehicle;
means for predicting respective positions of all sides of the associated vehicle at both a first future time, while the associated vehicle is moving in either a forward direction or a reverse direction, and a second future time;
means for generating first signals and second signals for causing an image illustrating all of the sides of the associated vehicle at the respective predicted positions at the first future time and the second future time relative to the object to be displayed on the associated display device;
means for generating gradient signals for causing shading in the representation of the associated vehicle on at least one side of the associated vehicle when the object is closer than a predetermined value to the respective side; and
an output transmitting the first signals to the associated display for causing the image illustrating all of the sides of the associated vehicle at the respective predicted positions at the first future time relative to the object to be displayed on the associated display device and transmitting the second signals to the associated display for causing the image illustrating all of the sides of the associated vehicle at the second respective predicted positions at the second future time relative to the object to be displayed on the associated display device, the image of the sides of the associated vehicle at the respective predicted positions at the first future time being illustrated simultaneously as the image of the sides of the associated vehicle at the respective predicted positions at the second future time.

2. The processing device for controlling an associated display as set forth in claim 1, wherein:
the means for predicting predicts the position of the associated vehicle at the first future time relative to the object.

3. The processing device for controlling an associated display as set forth in claim 1, wherein:
the output means simultaneously transmits the first signals and the second signals to the associated display.

4. The processing device for controlling an associated display as set forth in claim 1, wherein:
the means for generating the first signals causes a bird's eye view image of the associated vehicle at the predicted position at the first future time relative to the object to be displayed on the associated display device.

5. A processing device for controlling an associated display, the processing device adapted to:
receive an electronic signal from a plurality of object detectors positioned on and around an exterior of an associated vehicle, the object detectors detecting an object relative to the associated vehicle, the signal from the object detector representing the object;
predict a position of the associated vehicle at a first future time, while the associated vehicle is moving in either a forward direction or a reverse direction;
predict respective second positions of all sides of the associated vehicle at a second future time;
generate first signals for causing a representation illustrating all sides of the associated vehicle at the respective predicted positions at the first future time relative to the object to be displayed on the associated display device;
generate second signals for causing a representation illustrating all of the sides of the associated vehicle at the second respective predicted positions at the second future time relative to the object to be displayed on the associated display device;
generate gradient signals for causing shading in the representation of the associated vehicle on at least one side of the associated vehicle when the object is closer than a predetermined value to the respective side;
transmit the first signals to the associated display for causing the representation illustrating all sides of the associated vehicle at the respective predicted positions at the first future time relative to the object to be displayed on the associated display device; and
transmit the second signals to the associated display for causing the representation illustrating all of the sides of the associated vehicle at the second respective predicted positions at the second future time relative to the object to be displayed on the associated display device, the representation illustrating all of the sides of the associated vehicle at the respective predicted positions at the first future time being simultaneously displayed on the associated display device as the representation illustrating all of the sides of the associated vehicle at the second respective predicted positions at the second future time.

6. The processing device as set forth in claim 5, wherein:
the representation of the associated vehicle at the first future time is in a first color; and
the representation of the associated vehicle at the second future time is in a second color.

7. The processing device as set forth in claim 5, wherein:
the first future time and the second future time are configurable.

8. The processing device as set forth in claim 5, wherein:
the first future time is about 0.1 seconds; and
the second future time is about 0.2 seconds.

9. The processing device as set forth in claim 5, wherein:
the shading represents uncertainty in the predicted position of the associated vehicle at the first future time.

10. The processing device as set forth in claim 5, the processing device further adapted to:
highlight portions of the representation of the associated vehicle predicted to be within a predetermined distance of the object at the first future time.

11. The processing device as set forth in claim 5, the processing device further adapted to:
receive a signal from a sensor identifying a status of the associated vehicle; and
predict the position of the associated vehicle at the first future time based on the signal received from a sensor.

12. A method for controlling an associated display, the method comprising:
receiving an electronic signal from a plurality of object detectors positioned on and around an associated vehicle, the object detectors detecting an object relative to the associated vehicle, the signal from the object detector representing the object;

predicting respective positions of all sides of the associated vehicle at a first future time, while the associated vehicle is moving in either a forward direction or a reverse direction; predicting second respective positions of all of the sides of the associated vehicle at a second future time;

generating first signals for causing a representation illustrating all sides of the associated vehicle at the respective predicted positions at the first future time relative to the object to be displayed on the associated display device;

generating second signals for causing a representation illustrating all of the sides of the associated vehicle at the second respective predicted positions at the second future time relative to the object to be displayed on the associated display device;

generating gradient signals for causing shading in the representation of the associated vehicle on at least one side of the associated vehicle when the object is closer than a predetermined value to the respective side;

transmitting the first signals to the associated display for causing the representation illustrating all of the sides of the associated vehicle at the respective predicted positions at the first future time relative to the object to be displayed on the associated display device; and transmitting the second signals to the associated display for causing the representation illustrating all of the sides of the associated vehicle at the second respective predicted positions at the second future time relative to the object to be displayed on the associated display device, the representation illustrating all of the sides of the associated vehicle at the respective predicted positions at the first future time being simultaneously displayed on the associated display device as the representation illustrating all of the sides of the associated vehicle at the second respective predicted positions at the second future time.

13. The method for controlling an associated display as set forth in claim 12, the method further comprising:
representing the associated vehicle at the first future time in a first color; and
representing the associated vehicle at the second future time in a second color.

14. The method for controlling an associated display as set forth in claim 12, the method further comprising:
configuring the first future time and the second future time.

15. The method for controlling an associated display as set forth in claim 12, wherein:
the shading represents uncertainty in the predicted position of the associated vehicle at the first future time.

16. The method for controlling an associated display as set forth in claim 15, the method further comprising:
generating the gradient signals for causing the shading in the representation of the associated vehicle on a side of the associated vehicle laterally closer to the object.

17. A system for displaying a predicted position of an associated vehicle relative to an object at a first future time, the system comprising:

a plurality of object detectors positioned on and around the associated vehicle, the object detectors capable of detecting an object around the associated vehicle and transmitting a signal based on the object;

a sensor identifying a status of the associated vehicle and transmitting a signal based on the status of the associated vehicle;

a processing device adapted to:

receive the signal from the object detector, the signal from the object detector representing the object;

receive the signal based on the status of the associated vehicle;

predict respective positions of all sides of the associated vehicle at a first future time based on the status of the associated vehicle;

predict respective positions of the first and second portions of the articulated vehicle at the first future time, the respective first and second positions of all sides of the associated vehicle being predicted at the first future time while the associated vehicle is moving in either a forward direction or a reverse direction;

generate first signals for causing a representation illustrating all of the sides of the associated vehicle at the respective predicted positions at the first future time relative to the object to be displayed on the associated display device;

generate the first signals for causing respective representations of the first and second portions of the associated vehicle at the predicted positions at the first future time relative to the object to be displayed on the associated display device;

generate gradient signals for causing shading in the representation of the associated vehicle on at least one side of the associated vehicle when the object is closer than a predetermined value to the respective side;

transmit the first signals representing all of the sides of the associated vehicle at the predicted position at the first future time relative to the object; and transmit the first signals to the associated display for causing the respective representations of the first and second portions of the associated vehicle at the predicted position at the first future time relative to the object to be displayed on the associated display device; and a display device receiving the first signals representing all of the sides of the associated vehicle at the predicted position at the first future time relative to the object and displaying a representation of all sides of the associated vehicle at the respective predicted positions at the first future time relative to the object.

18. The system for displaying a predicted position of an associated vehicle relative to an object at a first future time as set forth in claim 17, wherein:
the status of the associated vehicle identified by the signal from the sensor is at least one of an angle at which an associated steering wheel is turned, a speed of an associated wheel, and a yaw rate of the associated vehicle.

* * * * *